(12) United States Patent
Handa

(10) Patent No.: US 6,769,505 B2
(45) Date of Patent: Aug. 3, 2004

(54) VEHICLE WITH TWO/FOUR WHEEL DRIVE SWITCHING DEVICE

(75) Inventor: Akio Handa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 78 days.

(21) Appl. No.: 09/964,387

(22) Filed: Sep. 28, 2001

(65) Prior Publication Data

US 2002/0038736 A1 Apr. 4, 2002

(30) Foreign Application Priority Data

Sep. 29, 2000 (JP) ......................................... 2000-301133

(51) Int. Cl.⁷ ............................................. B60K 23/08
(52) U.S. Cl. ..................................................... 180/247
(58) Field of Search ................................. 180/247, 233; 74/606 R; 475/206, 198

(56) References Cited

U.S. PATENT DOCUMENTS

| | | | | |
|---|---|---|---|---|
| 3,763,948 A | * | 10/1973 | Eggelton et al. | ............ 180/247 |
| 5,947,218 A | * | 9/1999 | Ishimaru | ..................... 180/53.1 |
| 6,033,334 A | * | 3/2000 | Showalter | ................... 475/206 |
| 6,125,961 A | * | 10/2000 | Matsufuji | .................... 180/233 |
| 6,155,395 A | * | 12/2000 | Braford, Jr. | ................. 192/48.3 |
| 6,530,447 B2 | * | 3/2003 | Seki et al. | ................... 180/233 |
| 2002/0046893 A1 | * | 4/2002 | Handa et al. | ............... 180/247 |
| 2002/0100629 A1 | * | 8/2002 | Handa ey al. | .............. 180/247 |

FOREIGN PATENT DOCUMENTS

GB 2126178 A * 3/1984 ........... B60K/17/34

* cited by examiner

Primary Examiner—Lesley D. Morris
Assistant Examiner—Paul Royal, Jr.
(74) Attorney, Agent, or Firm—Birch, Stewart, Kolasch & Birch, LLP

(57) ABSTRACT

A two/four-wheel drive switching device capable of avoiding interference with other components as far as possible at the time of installation of the device. All portions of a two/four-wheel drive switching device which portions are connected to a final reduction unit for front wheels are positioned below an upper surface of the device body.

16 Claims, 4 Drawing Sheets

VEHICLE WITH TWO/FOUR WHEEL DRIVE SWITCHING DEVICE

CROSS-REFERENCE TO RELATED APPLICATIONS

The present application claims priority under 35 USC 119 to Japanese Patent Application No. 2000-301133 filed on Sep. 29, 2001 the entire contents thereof is hereby incorporated by reference.

BACKGROUND OF THE INVENTION

1. Field of the Invention

The present invention relates to a two-/four-wheel drive switching device for a vehicle.

2. Description of Background Art

In a certain conventional four-wheel vehicle for off-road travel it is possible to select two operation modes according to traveling conditions, one being a two-wheel drive mode-in which power is transmitted to only front wheels or rear wheels and the other being a four-wheel drive mode in which power is transmitted to both front and rear wheels.

For switching between such operation modes, a two-/four-wheel drive switching device or clutch mechanism is mounted in a power transfer path between an engine and the front wheels or between the engine and the rear wheels. Generally, the two-/four-wheel drive switching device is attached to a final reduction unit which is disposed between both front wheels and the engine, or between both rear wheels and the engine.

In mounting the two-/four-wheel drive switching device to the final reduction unit, a mounting portion is projected outwards from an outside of the body of the drive switching device, and likewise a mounting portion is projected outwards from an outside of a casing of the final reduction unit. Then, these face each other and connected together with bolts or the like.

However, in case of thus connecting the two-/four-wheel drive switching device and the final reduction unit with each other through such mounting portions projected outwards from the device body and the casing, problems occur.

Inside the vehicle, where the final reduction unit and the two-/four-wheel drive switching device are installed, suspension units for supporting the front and rear wheels, and a steering mechanism for steering the front wheels are provided. Thus it is impossible to ensure a sufficiently large space.

Therefore, if the two-/four-wheel drive switching device installed in the small space provided when the mounting portion projects outwards from the device body, interference occurs between the mounting portion and other components, and any attempt to avoid such interference will encounter a limited position for installation of the drive switching device.

SUMMARY AND OBJECTS OF THE INVENTION

The present invention has been accomplished in view of such a conventional problems and it is an object of the invention to provide a two-/four-wheel drive switching device for a vehicle capable of avoiding interference with another component as far as possible at the time of installation.

For achieving the above-mentioned object, the two-/four-wheel drive switching device described in claim 1 of the present invention is attached to a vehicle to permit and inhibit the transfer of power between a final reductions unit and an engine, the vehicle comprising a pair of front wheels supported on the right and left sides of a front portion of a body frame, a pair of rear wheels supported on the right and left sides of a rear portion of the body frame, a steering shaft secured rotatably to the front portion of the body frame, the engine which is mounted on a central portion of the body frame, and the final reduction unit which is disposed between the front wheels and connected to the engine, wherein all portions connected to the final reduction unit are positioned below an upper surface of a body of the device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
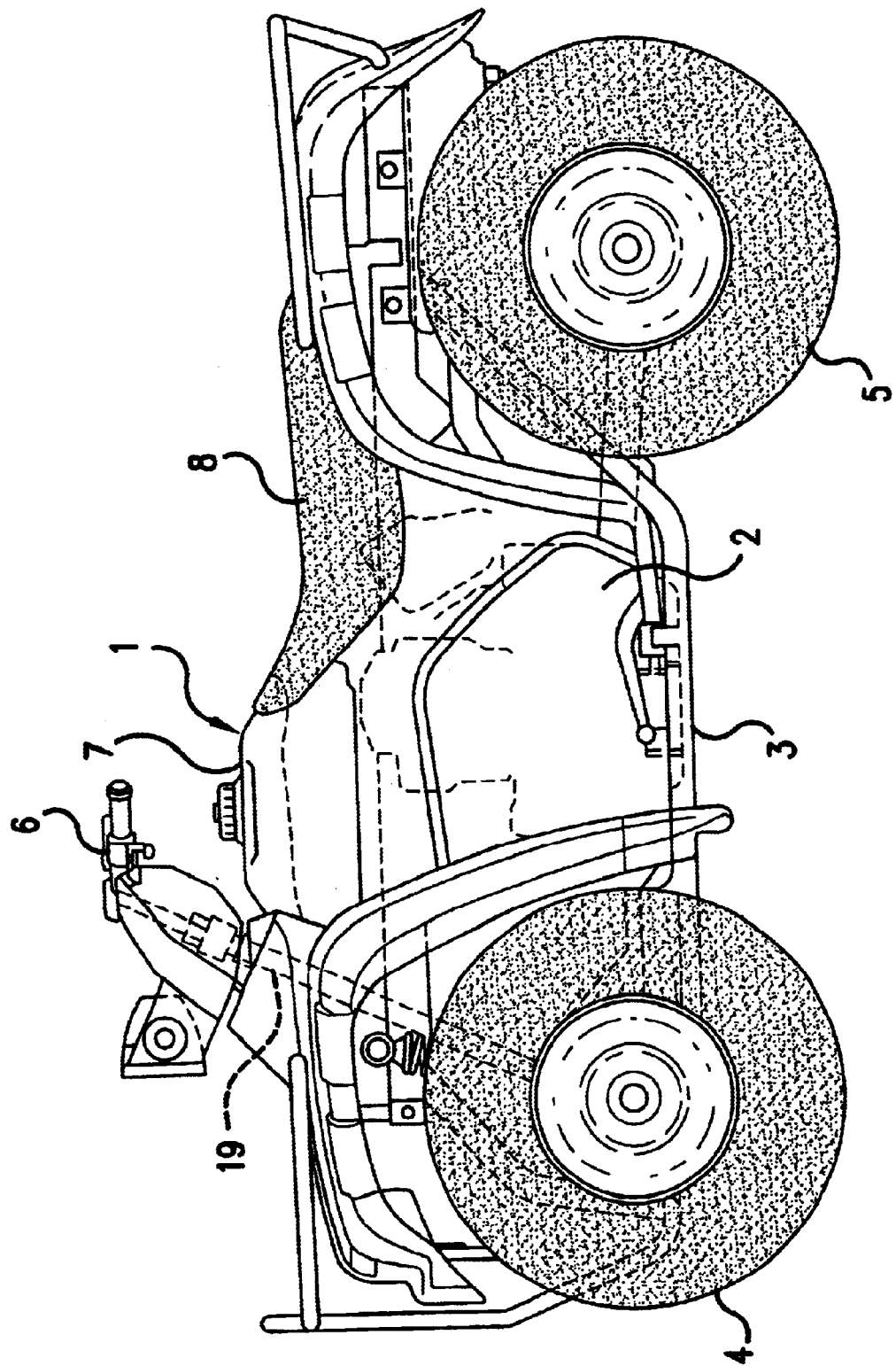
FIG. 1 is a side view of a off-road traveling vehicle as a vehicle to which an embodiment of the present invention is applied.
Figure 2:
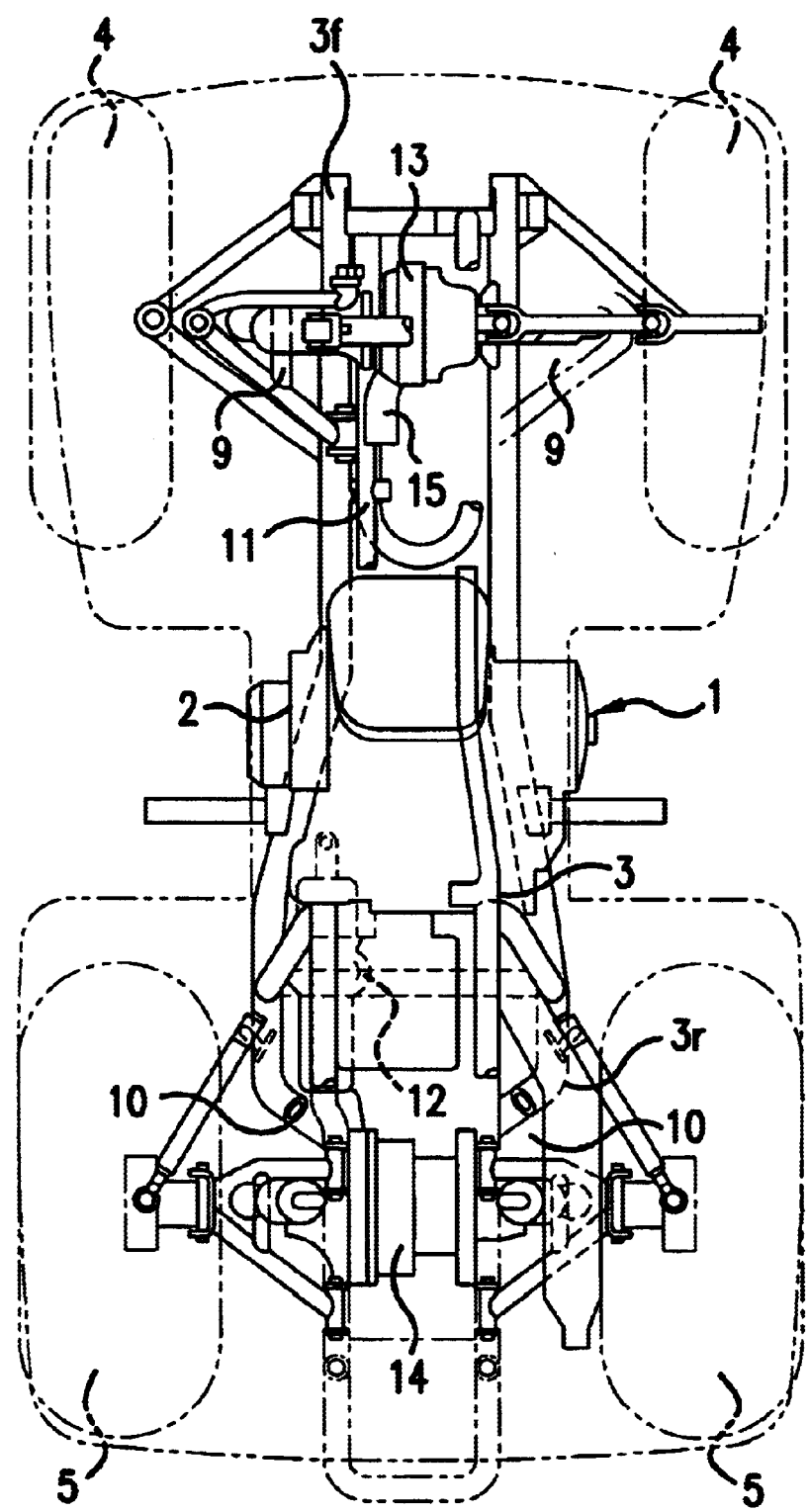
FIG. 2 is a plan view showing a body frame structure of the vehicle to which an embodiment of the present invention is applied.

An embodiment of the present invention will be described below with reference to the drawings. In FIGS. 1 and 2, illustrate a vehicle 1 to which the present invention is applied. In this embodiment the vehicle 1 is an off-road traveling vehicle.

The vehicle 1 is roughly constituted of a body frame 3 with an engine 2 mounted centrally thereon, front wheels 4 and rear wheels 5 are disposed on both sides of front and rear portions 3f, 3r, respectively, of the body frame 3, a steering handle 6 is attached to a front upper portion of the body frame 3 to steer the front wheels 4, a fuel tank 7 is installed on the body frame 3 at a position above the engine 2, and a seat 8 is installed behind the fuel tank 7.

As shown in FIG. 2, the front wheels 4 are supported vertically movably by suspension units 9 respectively which are provided on both sides of the front portion of the body frame 3, while the rear wheels 5 are supported vertically movably by suspension units 10 which are provided on both sides of the rear portion of the body frame 3.

A final reduction unit 13 for the front wheels and a final reduction unit 14 for the rear wheels are provided centrally in the front and rear portions of the body frame 3. The final reduction units 13 and 14 are connected to the engine 2 through propeller shafts 11 and 12, respectively.

Right and left front wheels 4 and right and left rear wheels 5 are connected to the final reduction units 13 and 14, respectively.

Figure 3:
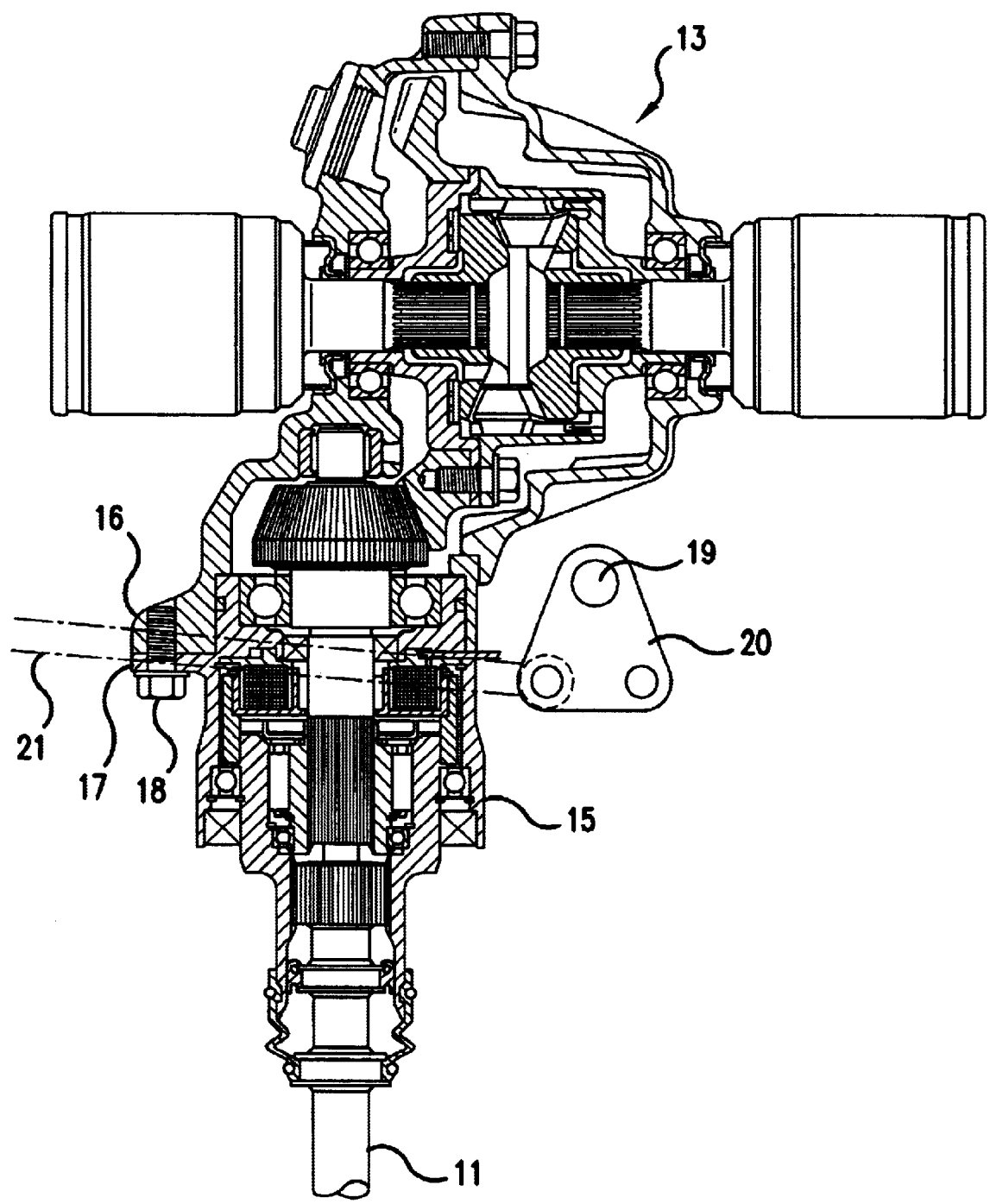
FIG. 3 is a transverse sectional view showing a principal portion of the embodiment.

In this embodiment, a two/four-wheel drive switching device 15 which permits or inhibits the transfer of power to the front wheels 4 for switching to a rear wheel drive or a four-wheel drive, as shown in FIG. 3, is disposed between the final reduction unit 13 for front wheels and the propeller shaft 11.

Alternatively, the two/four-wheel drive switching device 15 is disposed between the rear propeller shaft 12 and the final reduction unit 14 for the rear wheels for switching to a front-wheel drive or a four-wheel drive.

Such drive mode switching is performed by a vehicle driver in accordance with a road surface condition and a traveling condition.

The final reduction unit 13 for the front wheels and the two/four-wheel drive switching device 15 are provided with outer flanges 16 and 17, respectively, for connection of the two. Bolts 18 are inserted from the outer flanges 17 side of the two/four-wheel switching device 15 and are brought into threaded engagement with the outer flanges 16 provided on the final reduction unit 13 side for front wheels, whereby both outer flanges 16 and 17 are interconnected and the two/four-wheel drive switching device 15 is fixed to the final reduction unit 13 for the front wheels.

Figure 4:
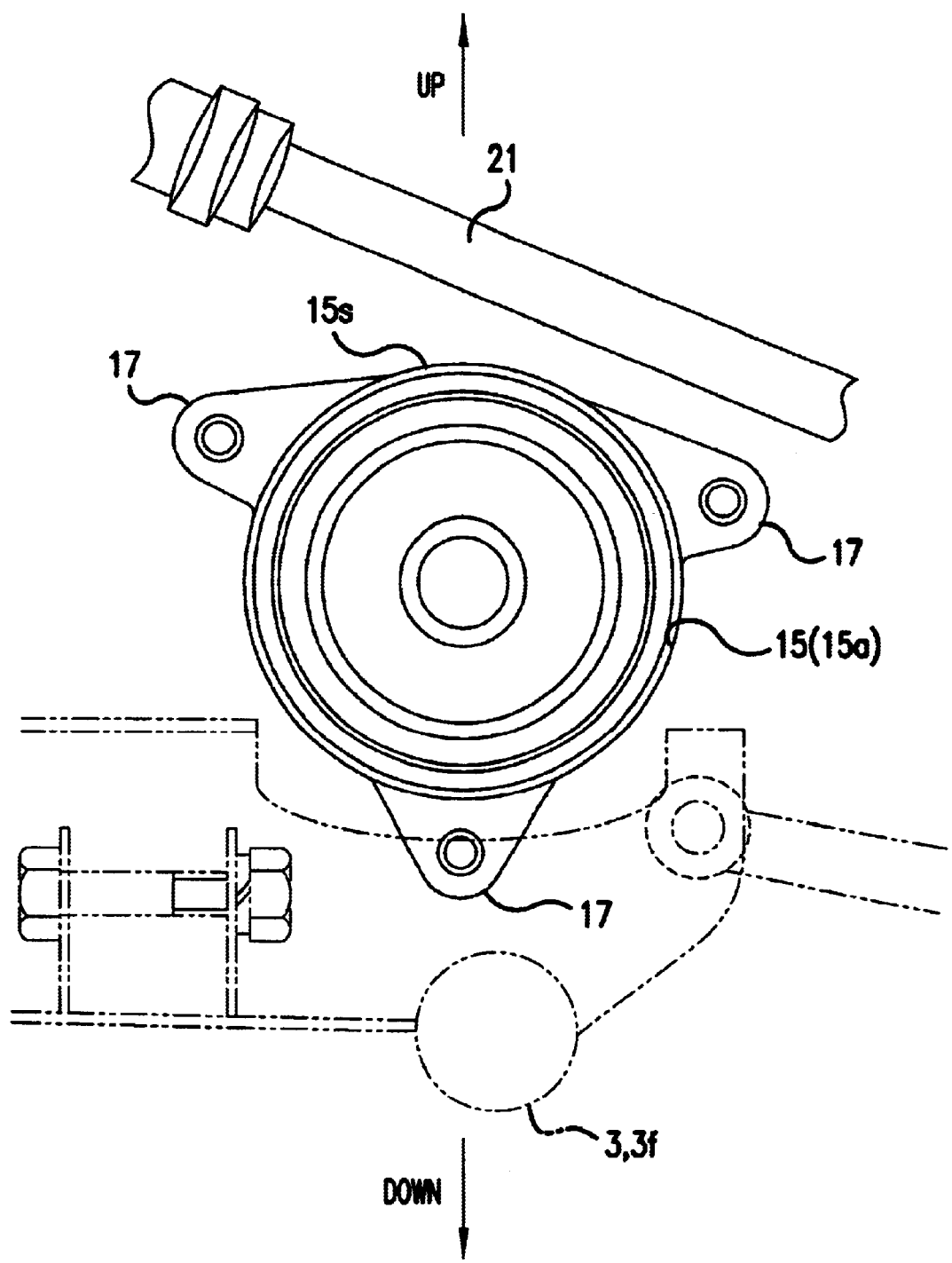
FIG. 4 is a front view showing a principal portion of the embodiment.

As shown in FIGS. 3 and 4, the outer flanges 16 and 17 are provided at three positions spaced from one another around the axis of the two/four-wheel drive switching device 15.

The outer flanges 16 and 17 establish their positions so that in a mounted state of the drive switching unit 15 to the vehicle body, all of the outer flanges are located below an upper surface 15s of a casing 15a of the drive switching unit 15.

On the other hand, a lower end portion of a steering shaft 19 (see FIG. 1) with a steering handle 6 secured thereto is located in the front portion 3f of the body frame 3 at an upper side position where the two/four-wheel drive switching device 15 is not present.

A steering arm 20 is attached to the lower end portion of the steering shaft 19 (see FIG. 3) and it is connected to knuckle arms (not shown) of the front wheels 4 through a tie rod 21.

Thus, the tie rod 21 is provided so as to cross above the two/four-wheel drive switching device 15 in a downwardly inclined state (see FIG. 3) toward the exterior of the vehicle body.

In the two/four-wheel drive switching device 15 of this embodiment constructed as above, the outer flanges 16 and 17 as mounting portions of the drive switching device 15 and the final reduction unit 13 for the front wheels are positioned below the upper surface 15s of the drive switching device 15, so that the interference thereof with another component such as the tie rod 21 which overlies them is avoided.

In the alternative, the tie rod 21 is allowed to swing vertically with a vertical swing motion of the front wheels 4 and the space for its swing motion is easily ensured.

Thus, a space can be ensured above the two/four-wheel drive switching device 15 and the degree of freedom in the layout of vehicular components is improved.

The shapes and sizes of the components referred to in the above embodiment are only examples and various modifications may be made according to design requirements, etc.

As set forth above, in the two/four-wheel drive switching device according to the present invention, all the connecting portions of the drive switching device for connection with the final reduction unit are positioned below the upper surface of the drive switching device, so that the interference thereof with another component positioned near the drive switching device is avoided. Therefore, it is possible to improve the degree of freedom in the layout of vehicular components.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle with a two/four-wheel drive switching device comprising:
   a pair of front wheels supported on the right and left sides of a front portion of a body frame;
   a pair of rear wheels supported on the right and left sides of a rear portion of the body frame;
   a steering shaft secured rotatably to the front portion of the body frame;
   an engine mounted on a central portion of the body frame; and
   a final reduction unit disposed between both said front wheels and connected to the engine, the two/four-wheel drive switching device being attached to the vehicle to permit and inhibit the transfer of power between the final reduction unit and the engine, and the two/four-wheel drive switching device having outer flanges portions for connection to the final reduction unit, the outer flanges being positioned below an upper surface of the two/four-wheel drive switching device.

2. The vehicle with a two/four-wheel drive switching device according to claim 1, wherein said two/four-wheel drive switching device includes a casing having a front portion, a rear portion, an upper surface, at least one flange secured to the front portion of said casing, and wherein said final reduction unit includes at least one flange secured to a rear portion thereof, said at least one flange secured to the front portion of said two/four wheel drive switching device being connected to said at least one flange secured to the rear portion of said final reduction unit for securing said two/four-wheel drive switching device to said rear portion of said final reduction unit.

3. The vehicle with a two/four-wheel drive switching device according to claim 2, wherein three flanges are secured to the front portion of said casing of the two/four wheel drive switching device and three flanges are secured to the rear portion of said final reduction unit for securing said front portion of said two/four-wheel switching device to said rear portion of said final reduction unit.

4. The vehicle with a two/four-wheel drive switching device according to claim 3, wherein said three flanges secured to the front portion of said two/four-wheel drive switching device and said three flanges secured to the rear portion of the final reduction unit are positioned below the upper surface of the casing of the two/four wheel drive switching device.

5. The vehicle with a two/four-wheel drive switching device according to claim 4, wherein the three flanges of the two/four-wheel drive switching unit are disposed respectively to the right of, to the left of, and downwardly of said casing of the two/four-wheel drive switching device to position all of the flanges below the upper surface of the casing of the two/four-wheel drive switching device.

6. The vehicle with a two/four-wheel drive switching device according to claim 1, wherein a lower end of said steering shaft is mounted above said upper surface of the casing of the two/four-wheel drive switching device and further including a steering arm mounted on the lower end of said steering shaft.

7. The vehicle with a two/four-wheel drive switching device according to claim 6, and further including at least one tie rod mounted on said steering arm and operatively mounted relative to said front wheels for manually steering the vehicle.

8. The vehicle with a two/four-wheel drive switching device according to claim 7, wherein said steering arm and said at least one tie rod are disposed above said upper surface of the casing of the two/four-wheel drive switching device.

9. A two/four-wheel drive switching device adapted to be used with a vehicle comprising:

a final reduction unit adapted to be disposed between front wheels of a vehicle, said final reduction unit being adapted to be connected to an engine; and the two/four-wheel drive switching device being adapted to be attached to the vehicle to permit and inhibit the transfer of power between the final reduction unit and the engine, the two/four wheel drive switching device having outer flanges for connection to the final reduction unit, the outer flanges being positioned below an upper surface of the two/four-wheel drive switching device.

10. The two/four-wheel drive switching device according to claim 9, wherein said unit two/four-wheel drive switching device includes a casing having a front portion, a rear portion, an upper surface, at least one flange secured to the front portion of said casing, and wherein said final reduction unit includes at least one flange secured to a rear portion thereof, said at least one flange secured to the front portion of said two/four-wheel drive switching device being connected to said at least one flange secured to the rear portion of said final reduction unit for securing said two/four-wheel drive switching device to said rear portion of said final reduction unit.

11. The two/four-wheel drive switching device according to claim 10, wherein three flanges are secured to the front portion of said casing of the two/four-wheel drive switching device and three flanges are secured to the rear portion of said final reduction unit for securing said front portion of said two/four-wheel switching device to said rear portion of said final reduction unit.

12. The two/four-wheel drive switching device according to claim 11, wherein said three flanges secured to the front portion of said drive switching device and said three flanges secured to the rear portion of the final reduction unit are positioned below the upper surface of the casing of the two/four-wheel drive switching device.

13. The two/four-wheel drive switching device according to claim 12, wherein the three flanges of the two/four-wheel drive switching unit are disposed respectively to the right of, to the left of, and downwardly of said casing of the two/four wheel drive switching device to position all of the flanges below the upper surface of the casing of the two/four-wheel drive switching device.

14. The two/four-wheel drive switching device according to claim 9, wherein a lower end of a steering shaft is mounted above said upper surface of the casing of the two/four-wheel drive switching device and further including a steering arm mounted on the lower end of said steering shaft.

15. The two/four-wheel drive switching device according to claim 14, and further including at least one tie rod mounted on said steering arm and operatively mounted relative to said front wheels for manually steering the vehicle.

16. The two/four-wheel drive switching device according to claim 15, wherein said steering arm and said at least one tie rod are disposed above said upper surface of the casing of the two/four-wheel drive switching device.

* * * * *